Aug. 30, 1932.  L. J. CAMPBELL  1,874,896
DOUBLE CLUTCH TRANSMISSION
Filed Feb. 27, 1928   4 Sheets-Sheet 1
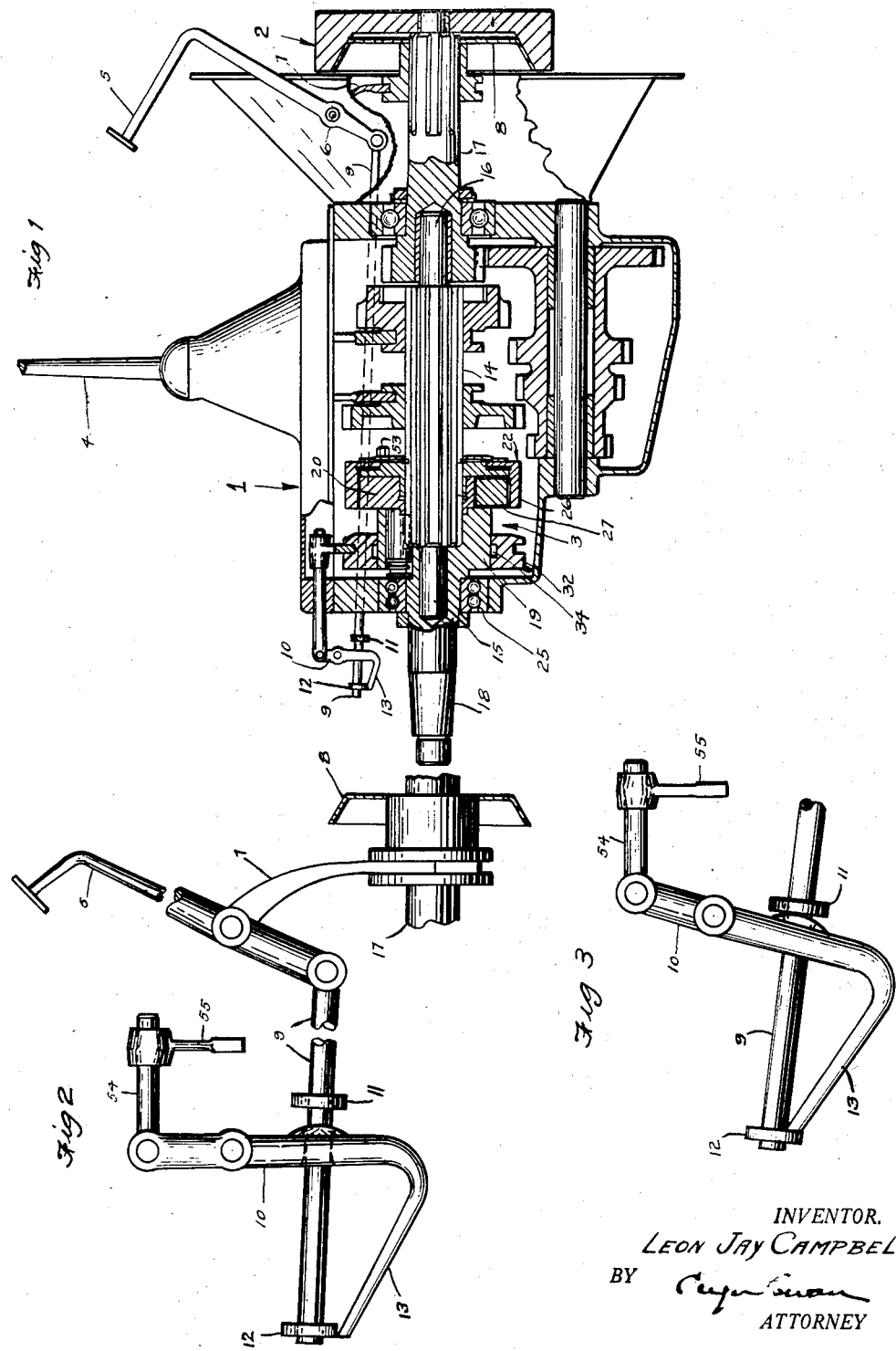
INVENTOR.
LEON JAY CAMPBELL
BY
ATTORNEY Aug. 30, 1932.   L. J. CAMPBELL   1,874,896
DOUBLE CLUTCH TRANSMISSION
Filed Feb. 27, 1928   4 Sheets-Sheet 2
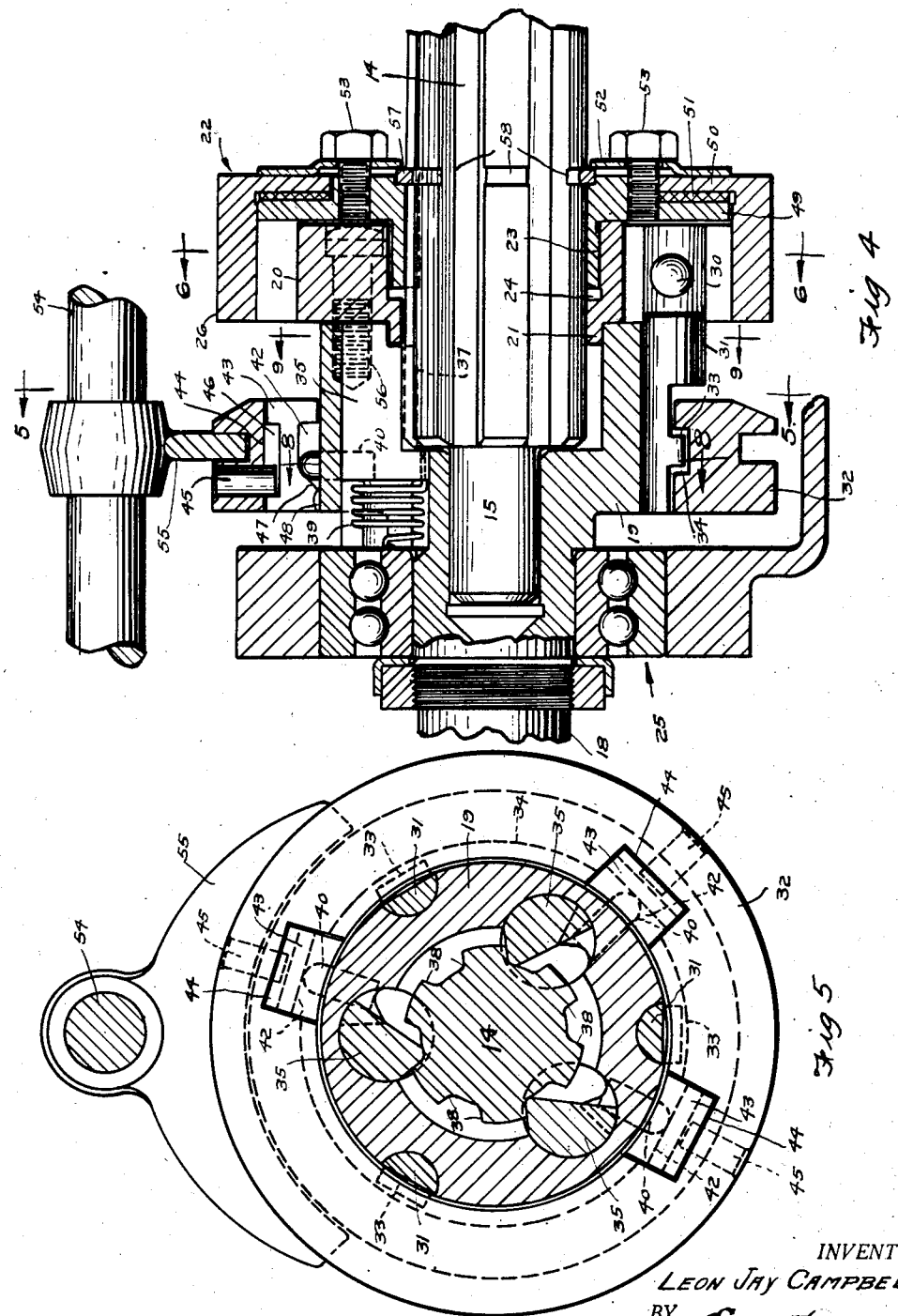
INVENTOR.
LEON JAY CAMPBELL
BY
ATTORNEY Aug. 30, 1932.  L. J. CAMPBELL  1,874,896
DOUBLE CLUTCH TRANSMISSION
Filed Feb. 27, 1928   4 Sheets-Sheet 3

INVENTOR.
LEON JAY CAMPBELL
BY
ATTORNEY

Aug. 30, 1932.  L. J. CAMPBELL  1,874,896
DOUBLE CLUTCH TRANSMISSION
Filed Feb. 27, 1928  4 Sheets-Sheet 4

INVENTOR.
LEON JAY CAMPBELL
BY
ATTORNEY

Patented Aug. 30, 1932

1,874,896

UNITED STATES PATENT OFFICE

LEON JAY CAMPBELL, OF BUCHANAN, MICHIGAN, ASSIGNOR, BY MESNE ASSIGNMENTS, TO FREE WHEELING PATENTS CORPORATION, OF SOUTH BEND, INDIANA, A CORPORATION OF DELAWARE

DOUBLE CLUTCH TRANSMISSION

Application filed February 27, 1928. Serial No. 257,356.

This invention relates to an auxiliary clutch for use with a motor vehicle transmission and which auxiliary clutch is so associated with the transmission and the motor clutch that when both clutches are disengaged the transmission is entirely free of power and load, thereby permitting speed changes to be rapidly and easily made in the transmissions without noise, clash, or jar, as heretofore.

One object of my invention is to provide means whereby the motor and auxiliary clutches are disengaged at the time speed changes are to be made and thus free the transmission of the engine as well as the rear end of the vehicle.

Another object of my invention is to make the connection between the motor clutch and the auxiliary clutch in such a manner that the auxiliary clutch will engage prior to the setting of the motor clutch, thereby permitting the transmission and the shiftable element of the motor clutch to be synchronized with the speed of the vehicle so as to prevent shock from the overrunning rear end of the vehicle when the motor clutch is engaged.

Another object of my invention is to provide a lost motion means in the connection between the motor clutch and the auxiliary clutch whereby the motor clutch may be normally engaged and disengaged without affecting the auxiliary clutch, and thus permit opening and closing of the motor clutch at the times when speed changes are not made.

A further object of my invention is to include in the auxiliary clutch a friction clutch whereby slippage may take place in the auxiliary clutch when the speed of the rear end of the vehicle develops a greater torque than the capacity of the friction clutch, thereby preventing damage to the clutch and the other parts of the vehicle, such as the transmission, rear axle, and associated connections.

Another object of my invention is to include in the auxiliary clutch an overrunning clutch and control means therefor whereby the overrunning clutch will be completely disengaged and allow the slide gears in the transmission to be free to turn in either direction so that speed changes can be readily and quickly made.

A further object of my invention is to provide a positive clutch in combination with the overrunning clutch and to control both clutches so that the overrunning clutch may engage in advance of the positive clutch and thus synchronize the transmission so that the positive clutch may engage without noise or shock to the mechanism.

The invention consists further in the matters hereinafter described and claimed.

In the accompanying drawings—

Fig. 1 is a vertical longitudinal sectional view, with parts in elevation, through a motor vehicle transmission and a motor clutch and auxiliary clutch assembly in accordance with my invention;

Fig. 2 shows the manner in which the motor clutch and the auxiliary clutch are connected in accordance with my invention;

Fig. 3 shows the way in which a positive return of the auxiliary clutch is obtained through the connection aforesaid;

Fig. 4 is an enlarged vertical sectional view through the auxiliary clutch;

Fig. 5 is a vertical sectional view taken on line 5—5 of Fig. 4;

Figure 8:
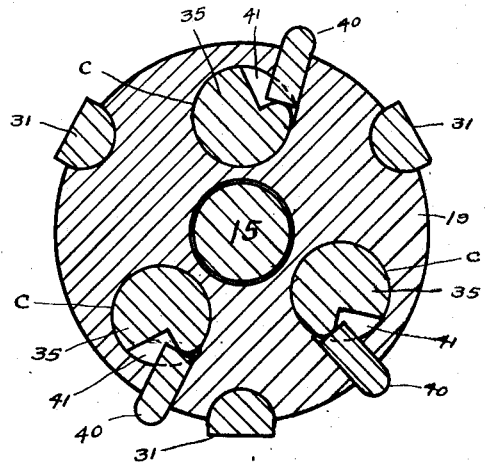
Figure 9:
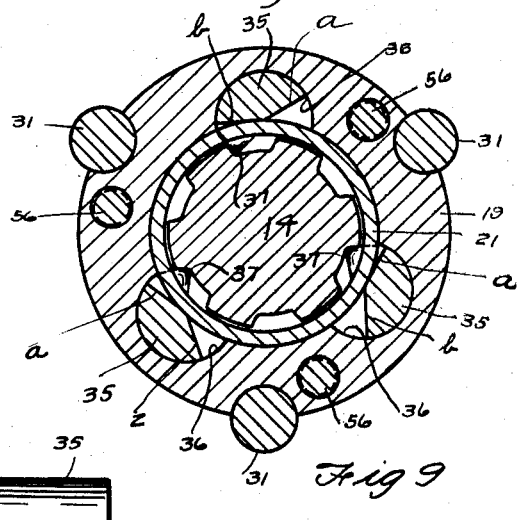
Figure 10:
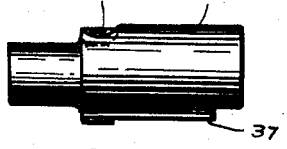
Figure 11:
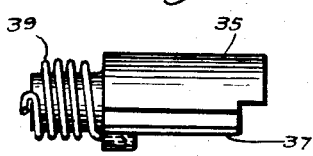

Figs. 8 and 9 are vertical sectional views taken on lines 8—8 and 9—9, respectively, of Fig. 4; and Figs. 10 and 11 are front and rear side views, respectively, of one of the keys used in the auxiliary clutch.

In Fig. 1, 1 indicates a conventional form of slide gear transmission, such as generally used on motor vehicles; 2 the motor clutch at the front end of the transmission, and 3 an auxiliary clutch at the rear end of the transmission in accordance with the arrangement of my invention. The speed changes in the transmission are effected in the usual manner, as through the manipulation of a shift lever 4, which operates through the usual rods and yokes to shift the slide gears in the transmission when the latter is of such type. The motor clutch is engaged and disengaged in the usual manner through the operation of the conventional clutch pedal 5, which is fixed to a rock shaft 6 and which shaft operates a throw-out yoke 7 connected to the movable member 8 of the motor clutch.

In accordance with my invention, I provide means for connecting the motor clutch 2 with the auxiliary clutch 3 whereby said clutches may be engaged and disengaged in sequence. One form of connecting means for this purpose is shown in Fig. 2. As there illustrated, 9 indicates a rod which is pivoted at one end to the lower end of the clutch pedal 5. The other end of the rod 9 extends through and past a pivoted lever 10, the upper end of which is connected with the shifting mechanism of the auxiliary clutch 3. Collars or enlargements 11, 12 are fixed on the rod 9 on opposite sides of the lever 10. The lower end of the latter is provided with a fixed arm 13 which co-operates with the collar 12 in the operation of the rod 9. When both clutches 2, 3 are engaged, the parts appear as in Figs. 1 and 2, and it will be noted that the arm 13 is out of the path of movement of the collar 12. This therefore permits the clutches 2, 3 to set automatically to take up wear without either of the collars 11 or 12 or the arm 13 interfering with the movement. At this time the collar 11 is spaced forward from the lever 10, thereby allowing the motor clutch 3 to be engaged and disengaged through the clutch pedal 5 without moving the lever 10, and thus the auxiliary clutch will not be affected when it is desired to merely release the motor clutch and not make any speed changes in the transmission. Continuing the clutch releasing movement of the clutch pedal 5 carries the collar 11 into contact with the lever 10 and the collar 12 rearward of the arm 13, whereupon the lever 10 will be moved in a direction to disengage the auxiliary clutch 3 and at the same time carry the arm 13 up into the path of return movement of the collar 12, as shown in Fig. 3.

During the first part of the return movement of the clutch pedal 5, the lever 10 is swung in a direction to engage the auxiliary clutch 3, due to the positive connection between the collar 12 and the arm 13 of said lever. Thus the auxiliary clutch 3 is engaged in advance of the motor clutch 2 as the latter does not engage until during the last part of the return movement of the clutch pedal. This occurs after the arm 13 has been carried in the swinging of the lever 10 out of the path of movement of the collar 12 whereupon the spring of the motor clutch may continue the movement of the rod 9 and set the motor clutch. The collar 11 at this time is moved forward and out of contact with the lever 10. By the connection shown and described the two clutches 2, 3 are not only operated in sequence through a single control member, such as the pedal 5, but the auxiliary clutch in being attached to the clutch pedal in no way interferes with the movement of the pedal or the motor clutch, and thus the latter is free to act as if there were no attachments to it.

Figure 6:
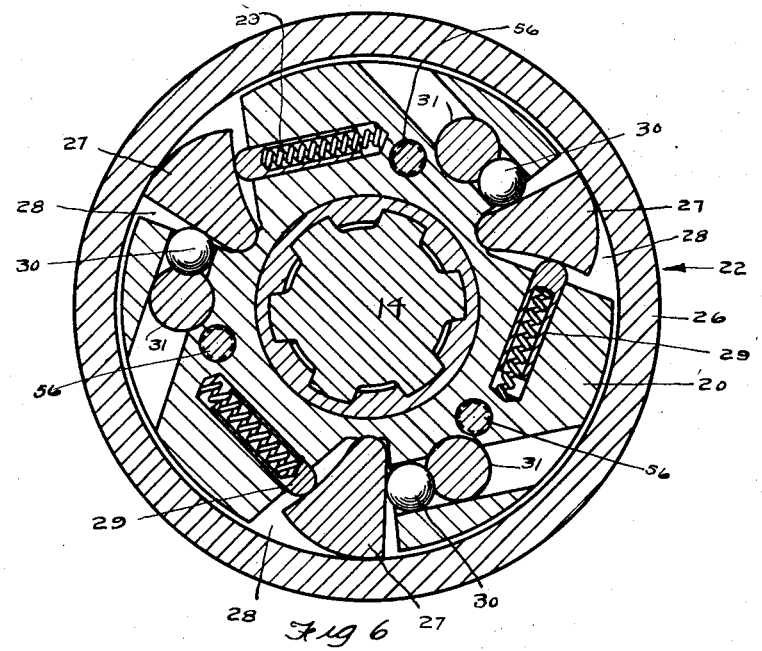
Fig. 6 is a vertical sectional view taken on line 6—6 of Fig. 4.

In Fig. 4, 14 indicates the splined shaft of the transmission on which the speed change gears are slidably mounted in accordance with the standard design. The shaft 14 has spigot bearings 15, 16 at its opposite ends with the clutch shaft 17 and rear axle connection shaft 18, respectively, as shown in Fig. 1. Supported in this way the transmission shaft 14 may freely revolve on its spigot bearings free of power and load when the motor clutch 2 and the auxiliary clutch 3 are both disengaged. Thus the slide gears of the transmission are free to turn with the shaft 14 in either direction and enable speed changes to be easily and quickly made without noise or clash at any speed of the motor or the vehicle as the transmission assembly is under neither load nor power.

Where the transmission shaft 14 extends into the driven shaft 18, the latter is provided with an enlarged annular head 19 which surrounds the adjacent splined portion of the transmission shaft 14, as shown in Fig. 4. A rotative member 20 surrounds the shaft 14 directly in front of the head 19 and is rigidly secured to said head. Said member 20 has an annular projection 21 which is overlapped by the adjacent forward end of the head 19 to align the parts and provide a key support. Associated with this member 20 is another rotative member 22 which is fixed to the shaft 14 through the splines thereon, as shown in Fig. 6. The member 22 is provided with a hub portion 23, which projects into a recess 24 in the bore of the member 20 and provides a bearing support therefor. This support in conjunction with the roller or ball bearing 25 mounted in the transmission case for the shaft 18, keeps the latter and the shaft 14 in axial alignment and prevents one from running eccentric with respect to the other.

The rotary member 22 is provided with a peripheral flange 26, which overhangs the rotary member 20. The latter carries a number of grip devices 27, which may take the form of pawls, dogs, or rollers, and these devices are located in notches 28 formed in the member 20 about the same and opening through the outer periphery thereof, as shown in Fig. 6. These devices 27 are rockably mounted in the bottoms of the notches 28 and when engaged with the inner surface of the flange 26 have a wedging action to couple the members 20 and 22 together for rotation in unison. Spring pressed plungers 29, 29 are carried by the member 20 and engage the rear sides of the devices 27 so as to normally urge them toward the flange 26.

Thus, when the devices 27 are free, they will frictionally take hold of the flange 26 and couple the members 20 and 22 together in the overrunning of one member with respect to the other in one direction.

To control the action of the devices 27 so that they may be moved into disengaged positions and thus permit the members 20 and 22 to be free for rotation with respect to each other in either direction, I provide balls 30, 30 which are carried by the member 20 on the sides of the devices 27 opposite the spring pressure thereon. For each ball, I provide a plunger 31 which is slidably mounted in the member 20 on the rear side of the ball and, when moved inward toward the ball, acts on the same to force and hold the associated pawl or dog 27 in disengaged position so that the pawl or dog is maintained completely out of contact with the inner surface of the flange 26. Thus, the pawls are prevented from resting or bearing on the flange and there is no drag on the parts to prevent free rotation of the shaft 14 and its gears when the clutches 2 and 3 are disengaged. Furthermore, the pawls can not burn or wear, as they are held out of rubbing contact with the flange in the free rotation of either member 20, 22. When the plungers 31 are withdrawn from the balls, the pawls or dogs 27 are then free to act under the spring pressure thereon to move into frictional engagement with the flange 26 and couple the members 20, 22 together.

For moving all the plungers 31 simultaneously, I provide a collar or shift ring 32 slidably mounted on the head 19. The plungers 31 are slidably mounted in the head 19 at its outer periphery and extend into the collar 32 where each plunger is provided with a lug 33 extending into an undercut annular groove 34 in the bore of the collar, as shown in Fig. 4. The groove 34 is slightly wider than the length of the lugs 33 so as to provide a slight lost motion connection between the collar and the plungers. Thus, as soon as the shift ring 32 withdraws the ends of the plungers 31 from over the centers of the balls 30, the spring pressure on the opposite sides of the pawls 27 will quickly move the plungers with respect to the ring and completely withdraw the plungers away from the balls and permit the pawls to snap into engagement with the inner surface of the flange 26 without interference by the plungers or the other parts of the control mechanism. In this way, the overrunning clutch may function as if free from any control mechanism and the pawls or dogs 27 may completely take hold as designed.

The positive clutch between the head 19 and the shaft 14 consists of a number of keys 35, 35 rockably mounted in one of said parts, as for instance in the head 19, as shown in the drawings. The grooves or key-seats 36 in which the keys are rockably mounted open inwardly intermediate their ends into the bore of the head 19 so that the lugs 37 on the keys may be rocked into and out of clutched engagement with the shoulders 38 formed by the splines in the shaft 14 as clearly shown in Fig. 5. The keys are so positioned that the driving faces of the lugs of certain of the keys are opposed to the driving face of another of the keys, so that one or more of the keys will take the drive in one direction, while another key will take the drive in the reverse direction and thereby provide a positive clutch for both directions. Each key 35 has one end extending over and supported by the projection 21 where the center or axis of the key rocks on the projection. The key on opposite sides of this center is angularly cut away as at $a$, $b$ so that the projection will not interfere with the rocking of the key, as shown in Fig. 9. The opposite end of the key is full round and is supported in a circular bore $c$ at the adjacent end of the key-way 36, as shown in Fig. 8.

For rocking the keys into engagement with the shoulders 38 on the shaft 14, I provide each key with a spiral spring 39. The spring surrounds a reduced end on the key and one end of the spring is fixed to the key and the other end is fixed to the inner ring of the anti-friction bearing for the shaft 18, which ring fits on the shaft and turns therewith, as indicated in Fig. 4. For moving the keys out of engagement with the shoulders 38, I provide at each key a plunger 40 slidably mounted in the head 19 and having its outer end extended outward beyond the periphery thereof, as shown in Figs. 4, 5, and 8. The inner ends of the plungers 40 engage in notches 41 in the round portions of the keys on one side of the axis thereof. The outer ends of the plungers 40 extend into recesses 42 in blocks 43, 43, which are slidably mounted in transverse key-ways 44 provided in the shift ring 32. The blocks 43 are retained in the key-ways by inwardly extending pins or lugs 45 carried by the ring 32 and extending into slots 46 in the respective blocks, as shown in Fig. 4. This provides a loose connection between the ring 32 and its blocks 43 so that the ring may be shifted to release the grip devices 27 before the plungers 40 are acted upon to rock the keys 35 out of clutched engagement with the shaft 14. The blocks being small and light may be shifted easily by the springs, and as a result the latter need not be made strong enough to shift the heavier shift ring.

The recesses 42 into which the outer ends of the plungers 40 project are provided at one end with cam surfaces 47 which when the blocks 43 are moved with the ring 32 ride over the outer ends of the plungers 40 and force them inward to rock the keys 35 out of clutched engagement with the shaft 14. Each block 43 is provided at the base of its cam surface 47 with a shallow recess 48 into which the rounded outer end of the adjacent plunger 40 takes at the completion of the rocking movement of the key into released position. At this time, the pins 45 are at the forward ends of the recesses 46 and the plungers 31 are behind the balls 30 so as to hold the pawls 27 disengaged. In the first part of the rearward movement of the shift ring 32 to effect engagement of the auxiliary clutch, the plungers 31 are withdrawn from the balls 30 so that the pawls 27 may engage the flange 26 and couple members 20 and 22 together. During this movement, the pins 45 ride in the recesses 46 and the blocks 43 are not moved. Before the pins 45 are moved into engagement with the rear ends of the recesses 46, the pawls or grip devices 27 have acted to synchronize the transmission due to the fact that the head 19 is propelled by the vehicle. In the continued rear movement of the ring 32, the pins 45 act on the rear ends of the recesses 46 and move the blocks 43 rearward, thereby withdrawing them from over the outer ends of the plungers 40 and permitting the springs 39 to rock the keys 35 toward the shaft 14 as soon as the plungers are opposite their recesses 42. As the blocks 43 are free, the springs 39 in acting to rock the keys 35 into engaging positions force the plungers 40 outward against the cam surfaces 47 and thus permit snapping of the keys into engagement with the shaft 14 without ratcheting thereover. Thus the keys are quick acting and are out of the control of the operator and, being free, may instantly take hold as soon as a shoulder 38 is in position to receive them.

The rotative member 22 is preferably made in two parts, the hub 23 being on the inner part and the overhanging flange 26 on the outer part. These parts have overlapping annular walls 49, 50 between which is located a ring of friction material 51, such as brake lining. The walls 49, 50 are clamped together with the friction lining therebetween by a spring plate 52 in the form of a ring which is secured by cap screws 53 to the inner part of the assembly, as shown in Fig. 4. This provides a friction clutch between the inner and outer parts of the member 22, and the capacity of the overrunning clutch is determined by the tension exerted by the spring plate 52 through the cap screws 52. Thus the overrunning clutch, of which the member 22 forms a part, is provided with means whereby a portion of the clutch may slip and relieve the clutch of any overrunning beyond the torque capacity of the grip devices 27. This prevents these devices from having any bursting action on the outer ring 26, and thus the clutch can not destroy itself.

Inasmuch as the pawls 27 may take hold at any point around the circumference of the flange 26, the pawls are not likely to engage or register with the positive clutch. Consequently, should the keys 35 be turned into engaging positions and strike the shaft between the shoulders 38, the friction clutch just described will permit slippage in the overrunning clutch when the motor clutch is engaged sufficiently to overcome the friction and thus bring the keys into proper position for engagement with the shoulders.

The ring 32 is shifted through the medium of a rod 54, which carries a fork 55 which engages the ring. This rod is pivoted to the end of the lever 10 opposite the arm 13, as shown in Fig. 2. The rotative member 20 is fastened to the head 19 by a number of cap screws 56. To hold the member 22 on the shaft 14, a split ring 57 is at the outer end of the hub 23 and snaps in notches 58 in the splines of the shaft, as shown in Fig. 4.

In operation, when the clutch pedal 5 is depressed, the motor clutch 2 is disengaged during the first part of the depression movement of the pedal, thereby releasing the transmission from the motor. During a continuance of the depressing movement of the pedal, the auxiliary clutch 3 is disengaged, thereby releasing the transmission from the rear axle. At this time the transmission is entirely free from power and load and the speed changes desired can be made. After the speed change has been perfected, the operator allows the clutch pedal 5 to return and during the first portion of the return movement of the pedal, the grip devices 27 are permitted to automatically engage and synchronize the transmission and the shiftable member 8 of the motor clutch with the vehicle speed.

During the next following portion of the return movement of the clutch pedal, the positive clutch as provided by the keys 35 is released for engagement. Then during the remaining portion of the return movement of the clutch pedal, the motor clutch is allowed to engage and connect the motor to the rear axle for driving the same at the speed provided in the transmission. As all the parts are rotating in unison before the motor clutch is allowed to engage, there is no shock or jar on the mechanism upon engagement of the motor clutch, and thus no strain is placed on the transmission or the rear axle or associated parts. This is especially advantageous at the time speed changes are made when the vehicle speed is faster than the engine speed because the transmission is synchronized with the overrunning rear end of the vehicle and thus when the motor clutch is allowed to engage, the completion of the clutch connection is made without any clash, noise, or jar or any strain on the parts.

Another important advantage of my invention resides in having the keys 35 of the positive clutch automatically take hold in opposite directions, and thus the engine of the vehicle may be used as a brake when descending a grade even though the overrunning clutch may be used in the auxiliary clutch.

Figure 7:
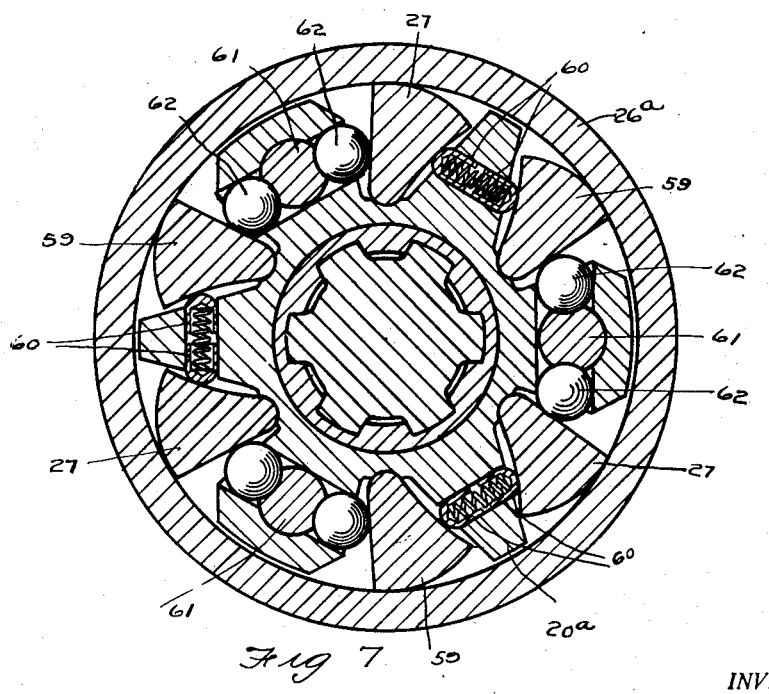
Fig. 7 is a vertical sectional view through a double acting overrunning clutch with control means in accordance with my invention.

In Fig. 6, the pawls 27 of the overrunning clutch act in one direction only. In Fig. 7 I have shown a double acting overrunning clutch, wherein two sets of pawls are employed, the pawls of one set marked 27, 27 correspond to the pawls 27 in Fig. 6. The pawls of the other set are marked 59, 59 and are arranged to grip the flange 26ª in a direction opposite to that of pawls 27. The pawls of both sets are rockably mounted in the inner rotative member 20ª, as before, and are pressed toward engaging positions by double acting spring-pressed plungers 60, 60 arranged between. For simultaneously moving the pawls of both sets into disengaged positions, I provide plungers 61, 61 slidably mounted in the member 20ª as before, but arranged balls 62, 62 on opposite sides of each plunger, as shown. Thus, when the plungers are moved between the balls, the latter will be moved or spread apart and acting on the adjacent pawls 27, 59 will move them to and hold them in released positions.

With the double acting overrunning clutch as just described, the drive through the clutch may be in both directions and thus the clutch will automatically take hold regardless of which rotative member of the clutch overruns the other in either direction. Thus, should the engine speed be greater than the vehicle speed at the time of engaging the motor clutch 2, the pawls or dogs 59 will take hold, while the pawls 27 will take hold when the vehicle speed is greater than the motor speed.

The double overrunning clutch may be used with or without the positive key-clutch, because the overrunning clutch will act to drive in opposite directions.

While I have shown and described herein my invention as adapted for automotive uses, it can be equally as well employed in other connections, such as in machinery installations where the combination of a positive and a friction clutch is required to gradually pick up a dead load and set it in rotation in synchronism with the rotating drive shaft of the prime mover before the positive clutch is allowed to engage. In using the friction clutch to merely pick up the dead load and set in rotation, only a limited amount of the torque of the engine or prime mover is exerted on the friction clutch. Consequently the friction clutch need not be made large enough to take the entire torque of the motor, which torque is taken care of by the positive clutch. The result is that the entire assembly may be made compact and small in size and light in weight and not only fit in the narrow confines allowed in automotive design, but be located in places where a large friction clutch could not be used. Moreover, with friction clutches heretofore employed, there has been considerable drag in the clutches even when released, whereas with my invention, there is no drag in the pawl clutch. Furthermore, the auxiliary clutch of my invention has no spring pressure to overcome in the opening and closing of the clutch except the slight pressure of the springs 39, and thus the power to open the clutch is no more than required to normally actuate the clutch pedal. The clutch of my invention is simple in construction, and inexpensive to manufacture for the capacities required.

The details of construction and arrangement of parts shown and described may be variously changed and modified without departing from the spirit and scope of my invention.

I claim as my invention:—

1. A clutch mechanism comprising, in combination with two relatively rotatable members, two sequentially acting sets of grip devices carried by one of said members for automatically engaging the other member in the overrunning of said members in opposite directions, and control means carried by the member carrying the devices for releasing the devices and holding them in released position completely disengaged from the other member.

2. A clutch mechanism comprising, in combination, a positive clutch and an overrunning clutch acting in parallel between a driving member and a driven member, and friction means included in the overrunning clutch allowing slippage in the latter so that the positive clutch may engage.

3. A clutch mechanism comprising, in combination, a positive key clutch, an automatically acting overrunning grip clutch, means for disengaging said clutchs one after the other but permitting the overrunning clutch to engage in advance of the positive clutch, and friction means included in the overrunning clutch allowing slippage in the latter so that the keys will automatically engage.

4. The combination with aligned driving and driven shafts with an annular portion on the driven shaft extending over and about the driving shaft, of a rotary member fixed to the driving shaft beyond said annular portion, grip devices and rockable clutch keys carried by said annular portion with the grip devices engageable with the rotary member and the keys engageable with the driving shaft, and means for controlling the engagement and disengagement of the devices and keys, respectively.

5. The combination with two aligned shafts with one of the shafts having an annular portion overhanging the other shaft, of a rotary member fixed to the last named shaft, grip devices interposed between the rotary member and the annular portion and carried by one of them, rockable clutch keys associated with the overhanging portion and the shaft and carried by one of them, and means for controlling the engagement and disengagement of the devices and keys, respectively.

6. A clutch mechanism, comprising in combination, a spring actuated positive clutch, an overrunning clutch, and means controlling the engagement and disengagement of the respective clutches, said means including a shift ring and a lost motion connection whereby the control of one clutch may be effected in advance of the other.

7. A clutch mechanism, comprising, in combination with two relatively rotatable members, grip devices carried by one of said members for automatically engaging the other member in the overrunning of one member with respect to the other, and control means for effecting the release of said devices, said control means including a shift ring and a plunger for each of the devices with a lost motion connection between the ring and the plungers whereby the devices may have a quick snap movement into engaged positions.

8. A clutch mechanism comprising, in combination with a shaft, a rotative member loosely mounted thereon, keys rockably mounted on said member, means for rocking the keys into clutched engagement with the shaft, plungers slidably mounted in said member and engaging said keys, and a shift ring operable over the outer ends of the plungers for rocking the keys by the plungers.

9. A clutch mechanism comprising, in combination with a shaft, a rotative member loosely mounted thereon, keys rockably mounted on said member, means for rocking the keys into clutched engagement with the shaft, plungers slidably mounted in said member and engaging said keys, a shift ring operable over the outer ends of the plungers for rocking the keys thereby from the shaft, and means providing a loose connection between the ring and the plungers whereby the keys may automatically rock into engagement with the shaft free of the ring.

10. A clutch mechanism comprising, in combination with a shaft, a rotative member loosely mounted thereon, keys rockably mounted on said member, means for rocking the keys into clutched engagement with the shaft, plungers slidably mounted in said member and engaging said keys, a shift ring operable over the outer ends of the plungers for rocking the keys thereby from the shaft, and blocks slidably mounted in the ring at the plungers, said blocks having a loose connection with the ring and having recesses to receive the outer ends of the plungers.

11. The combination with a changeable speed transmission for motor vehicles including a motor clutch and an auxiliary clutch associated with the transmission, and a clutch pedal and a pivoted lever for the respective clutches, of a rod connected with the pedal and extending through the pivoted lever, collars fixed on the rod on opposite sides of the lever and in spaced relation thereto, and an arm fixed to the lever and movable into the path of one collar upon movement of the lever by the other collar for effecting a positive return of the auxiliary clutch.

12. A clutch mechanism comprising in combination, a shaft, two members arranged one within the other and surrounding said shaft, grip devices carried by one member for automatically engaging the other member in the overrunning of one member with respect to the other, and a friction coupling between said other member and said shaft for permitting slippage between said member and said shaft, and a positive clutch for connecting said member and said shaft upon slippage of said friction coupling.

13. A clutch mechanism comprising in combination, a shaft, two members arranged one within the other and surrounding said shaft, grip devices carried by one member for automatically engaging the other member in the overrunning of one member with respect to the other, and a friction coupling between said other member and said shaft for permitting slippage between said member and said shaft comprising overlapping annular walls respectively fixed to said member and said shaft a friction ring disposed between said walls, and means for yieldingly urging said walls towards each other and against said ring.

14. A clutch mechanism comprising in combination, a shaft having longitudinally extending shoulders on its periphery, a rotative member loosely mounted about said shaft, keys journaled in said member to rotate about an axis parallel to the axis of the shaft into and out of engagement with said shoulders, springs yieldably retaining said keys in engagement with said shoulders, and means common to said keys for rocking the same out of engagement with said shoulders, said rocking means including radially movable plungers respectively engaging said keys, and an axially movable ring surrounding said rotative member and having cam connections with the outer ends of said plungers.

15. A clutch mechanism comprising in combination, a shaft having longitudinally extending shoulders on its periphery, a rotative member loosely mounted about said shaft, keys journaled in said member to rotate about an axis parallel to the axis of the shaft into and out of engagement with said shoulders, springs yieldably retaining said keys in engagement with said shoulders, and means common to said keys for rocking the same out of engagement with said shoulders, said rocking means including radially movable plungers respectively engaging said keys, an axially movable ring surrounding the rotative member and provided with recesses in its inner face registering with the respective plungers, axially movable cam blocks slidably mounted in said recesses for cooperation with said plungers, loose connections between said ring and said blocks, and means for shifting said ring to effect engagement and disengagement between said rotative members and said shaft.

16. A clutch mechanism comprising, in combination with a shaft, three annular members surrounding said shaft, one of said members being rotatable on said shaft, another of said members being fixed on said shaft, and the said third member being mounted on said fixed member, gripping elements between said rotatable member and said third member, and a friction connection between said third member and said fixed member, whereby said shaft may rotate under load with respect to said rotatable member after said gripping elements are engaged.

17. A clutch mechanism comprising, in combination with a pair of aligned shafts, shoulders on one of said shafts, a positive clutch having rockable keys engageable with said shoulders, an overrunning clutch mounted on said shafts, and friction means included in said overrunning clutch to allow slippage therein so that the keys of said positive clutch may engage said shoulders.

18. A clutch mechanism comprising, in combination, a positive clutch, an overrunning clutch, friction means in said overrunning clutch to allow slippage so that said positive clutch may engage, and means for disengaging said clutches one after the other but permitting said overrunning clutch to engage in advance of said positive clutch.

19. A clutch mechanism for connecting a drive shaft and a driven shaft comprising, in combination, two-way clutch means, a one-way clutch in combination therewith acting to synchronize the speed of said shafts, and friction means included in the one-way clutch to permit relative displacement of said shafts to transfer the load from the one-way clutch to the two-way clutch when the torque on the one-way clutch exceeds the limit for which said friction means is adjusted.

In testimony whereof I affix my signature this 22nd day of February, 1928.

LEON JAY CAMPBELL.